United States Patent Office 3,217,041
Patented Nov. 9, 1965

3,217,041
PREPARATION OF OLEFINIC OXYGEN-CONTAINING COMPOUNDS
William J. Houlihan, Colonia, N.J., assignor to Universal Oil Products Company, Des Plaines, Ill., a corporation of Delaware
No Drawing. Filed Aug. 8, 1962, Ser. No. 215,512
6 Claims. (Cl. 260—601)

This application relates to a process for the production of unsaturated oxygen-containing compounds and particularly to a method for the preparation of olefinic oxygen-containing compounds. More specifically the invention is concerned with a process for preparing unconjugated olefinic aldehydes or ketones.

It has now been discovered that unconjugated olefinic oxygen-containing compounds such as olefinic aldehydes or ketones may be prepared by decomposing a cyclic hydroxy olefin and particularly a cyclic beta-hydroxy olefin. The products which are prepared according to the process of this invention will find a wide variety of uses in the chemical field and particularly in the field of vitamin intermediates, pharmaceuticals and aroma chemicals, the aroma chemicals then being used in perfumes, colognes, soaps, etc. A particular application of the process of this invention is found in a process for producing a compound such as citronellal by decomposing isopulegol. The citronellal thus produced can be either optically active or inactive. It is, of course, preferred to prepare optically active molecules such as citronellal which are used in pharmaceutical chemicals inasmuch as the aforementioned optically active molecules retain their potency for a relatively longer length of time than do molecules which are optically inactive. This is a distinct advantage in most instances inasmuch as it will permit the finished products, be they vitamins or pharmaceuticals to be kept in storage, in warehouses or on retailers shelves for a relatively long period of time without losing their effectiveness.

It is therefore an object of this invention to provide an economical method for the preparation of unsaturated oxygen-containing compounds.

A further object of this invention is to provide a process for the preparation of unconjugated olefinic aldehydes or ketones which are thereafter utilized as intermediates in the preparation of aroma chemicals, vitamin intermediates, etc.

Taken in its broadest aspect one embodiment of this invention resides in a process for the production of an unconjugated olefinic oxygen-containing compound which comprises decomposing an alkenyl hydroxycycloalkane at an elevated temperature in the presence of a copper-containing catalyst, and recovering the desired product.

A further embodiment of this invention is found in a process for the production of an unconjugated olefinic oxygen-containing compound which comprises decomposing an alkenyl-beta-hydroxycycloalkane at a temperature in the range of from about 300° to about 400° C. in the presence of a copper-containing catalyst, and recovering the desired product.

Yet another embodiment of this invention is found in a process for the production of an unconjugated olefinic aldehyde which comprises decomposing an alkenyl-beta-hydroxycycloalkane at a temperature in the range of from about 300° to about 400° C. in the presence of a copper chromite catalyst, and recovering the desired unconjugated olefinic aldehyde.

A specific embodiment of this invention is found in a process for the production of an unconjugated olefinic aldehyde which comprises decomposing 2-isopropenyl-5-methylcyclohexanol at a temperature in the range of from about 325° to about 375° C. in the presence of a copper chromite catalyst, and recovering the desired 3,7-dimethyloct-6-en-1-al.

Other objects and embodiments referring to alternative beta-hydroxy olefins will be found in the following further detailed description of this invention.

As hereinbefore set forth it has now been discovered that olefinic aldehydes or ketones which are valuable intermediates in the preparation of aroma chemicals or vitamin intermediates may be prepared by decomposing a cyclic beta-hydroxy olefin at an elevated temperature in the presence of a copper-containing catalyst. This reaction to form aldehydes or ketones having an open chain configuration is unexpected and novel inasmuch as menthols usually undergo dehydrogenation when subjected to temperatures within the range of the operating conditions of the present process. In addition, it has been found that the use of a copper-containing catalyst will allow the decomposition to proceed at a lower temperature then heretofore used when treating these cyclic hydroxy olefins. It has further been found that the decomposition of the hydroxy olefins and particularly beta-hydroxy olefins is only effective when a beta-hydroxy olefin having a cyclic configuration is used, it having been found that open chain molecules do not undergo this decomposition at lower temperatures to form the desired compound.

Cyclic beta-hydroxy olefins which may be designated as 2-alkenyl-1-hydroxycycloalkanes possess the generic formula:

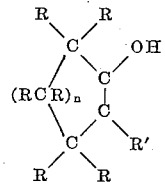

in which R' is an alkenyl radical such as vinyl, propenyl, isopropenyl, 1-butenyl, etc. radicals, R's are selected from the group consisting of alkyl, aryl, alkenyl, aralkyl, alkaryl radicals and hydrogen and $n$ is an integer of from 1 to about 4 are utilized in this process. Examples of 2-alkenyl-1-hydroxycycloalkanes containing only carbon, hydrogen and oxygen atoms which fall within the above formula include 2-vinylcyclopentanol,
2-vinylcyclohexanol,
2-vinylcycloheptanol,
2-vinylcyclooctanol,
2-propenylcyclopentanol,
2-propenylcyclohexanol,
2-propenylcycloheptanol,
2-propenylcyclooctanol,
2-isopropenylcyclopentanol,
2-isopropenylcyclohexanol,
2-isopropenylcycloheptanol,
2-isopropenylcyclooctanol,
2-butenylcyclopentanol,
2-butenylcyclohexanol,
2-butenylcycloheptanol,
2-butenylcyclooctanol,
2-vinyl-5-methylcyclopentanol,
2-vinyl-5-methylcyclohexanol,
2-vinyl-5-methylcycloheptanol,
2vinyl-5-methylcyclooctanol,
2-propenyl-5-methylcyclopentanol,
2-propenyl-5-methylcyclohexanol,
2-propenyl-5-methylcycloheptanol,
2-propenyl-5-methylcyclooctanol,
2-isopropenyl-5-methylcyclopentanol, 2-isopropenyl-5-methylcyclohexanol,
2-isopropenyl-5-methylcycloheptanol,
2-isopropenyl-5-methylcyclooctanol,
2-vinyl-5-ethylcyclopentanol,
2-vinyl-5-ethylcyclohexanol,
2-vinyl-5-ethylcycloheptanol,
2-vinyl-5-ethylcyclooctanol,
2-propenyl-5-ethylcyclopentanol,
2-propenyl-5-ethylcyclohexanol,
2-propenyl-5-ethylcycloheptanol,
2-propenyl-5-ethylcyclooctanol,
2-isopropenyl-5-ethylcyclopentanol,
2-isopropenyl-5-ethylcyclohexanol,
2-isopropenyl-5-ethylcycloheptanol,
2-isopropenyl-5-ethylcyclooctanol,
2-vinyl-5-propylcyclopentanol,
2-vinyl-5-propylcyclohexanol,
2-vinyl-5-propylcycloheptanol,
2-vinyl-5-propylcyclooctanol,
2-propenyl-5-propylcyclopentanol,
2-propenyl-5-propylcyclohexanol,
2-propenyl-5-propylcycloheptanol,
2-propenyl-5-propylcyclooctanol,
2-isopropenyl-5-propylcyclopentanol,
2-isopropyenyl-5-propylcyclohexanol,
2-isopropenyl-5-propylcycloheptanol,
2-isopropenyl-5-propylclocloctanol,
2-vinyl-3,5-dimethylcyclopentanol,
2-vinyl-3,5-dimethylcyclohexanol,
2-vinyl-3,5-dimethylcycloheptanol,
2-vinyl-3,5-dimethylcyclooctanol,
2-propenyl-3,5-dimethylcyclopentanol,
2-propenyl-3,5-dimethylcyclohexanol,
2-propenyl-3,5-dimethylcycloheptanol,
2-propenyl-3,5-dimethylcyclooctanol,
2-isopropenyl-3,5-dimethylcyclopentanol,
2-isopropenyl-3,5-dimethylcyclohexanol,
2-isopropenyl-3,5-dimethylcycloheptanol,
2-isopropenyl-3,5-dimethylcyclooctanol,
2-vinyl-4,5-dimethylcyclopentanol,
2-vinyl-4,5-dimethylcyclohexanol,
2-vinyl-4,5-dimethylcycloheptanol,
2-vinyl-4,5-dimethylcyclooctanol,
2-propenyl-4,5-dimethylcyclopentanol,
2-propenyl-4,5-dimethylcyclohexanol,
2-propenyl-4,5-dimethylcycloheptanol,
2-propenyl-4,5-dimethylcyclooctanol,
2-isopropenyl-4,5-dimethylcyclopentanol,
2-isopropenyl-4,5-dimethylcyclohexanol,
2-isopropenyl-4,5-dimethylcycloheptanol,
2-isopropenyl-4,5-dimethylcyclooctanol,
2-vinyl-5-phenylcyclopentanol,
2-vinyl-5-phenylcyclohexanol,
2-vinyl-5-phenylcycloheptanol,
2-vinyl-5-phenylcyclooctanol,
2-propenyl-5-phenylcyclopentanol,
2-propenyl-5-phenylcyclohexanol,
2-propenyl-5-phenylcycloheptanol,
2-propenyl-5-phenylcyclooctanol,
2-isopropenyl-5-phenylcyclopentanol,
2-isopropenyl-5-phenylcyclohexanol,
2-isopropenyl-5-phenylcycloheptanol,
2-isopropenyl-5-phenylcyclooctanol,
2-vinyl-5-benzylcyclopentanol,
2-vinyl-5-benzylcyclohexanol,
2-vinyl-5-benzylcycloheptanol,
2-vinyl-5-benzylcyclooctanol,
2-propenyl-5-benzylcyclopentanol,
2-propenyl-5-benzylcyclohexanol,
2-propenyl-5-benzyclcycloheptanol,
2-propenyl-5-benzylcyclooctanol,
2-isopropenyl-5-benzylcyclopentanol,
2-isopropenyl-5-benzylcyclohexanol,
2-isopropenyl-5-benzylcycloheptanol,
2-isopropenyl-5-benzylcyclooctanol,
2-vinyl-5-p-tolylcyclopentanol,
2-vinyl-5--p-tolylcyclohexanol,
2-vinyl-5-p-tolylcycloheptanol,
2-vinyl-5-p-tolylcyclooctanol,
2-allyl-5-p-tolylcyclopentanol,
2-allyl-5-p-tolylcyclohexanol,
2-allyl-5-p-tolylcycloheptanol,
2-allyl-5-p-tolylcyclooctanol,
2-isopropenyl-5-p-tolylcyclopentanol,
2-isopropenyl-5-p-tolylcyclohexanol,
2-isopropenyl-5-p-tolylcycloheptanol,
2-isopropenyl-5-p-tolylcyclooctanol,
2-vinyl-5-allylcyclopentanol,
2-vinyl-5-allylcyclohexanol,
2-vinyl-5-allylcycloheptanol,
2-vinyl-5-allylcyclooctanol,
2-propenyl-5-allylcyclopentanol,
2-propenyl-5-allylcyclohexanol,
2-propenyl-5-allylcycloheptanol,
2-propenyl-5-allylcyclooctanol,
2-isopropenyl-5-allylcyclopentanol,
2-isopropenyl-5-allylcyclohexanol,
2-isopropenyl-5-allylcycloheptanol,
2-isopropenyl-5-allylcyclooctanol, etc.

It is to be understood that the aforementioned compounds are only representatives of the type of 2-alkenyl-1-hydroxycycloalkanes which may undergo decomposition according to the process hereinbefore described and that the present invention is not necessarily limited thereto.

The 2-alkenyl-1-hydroxycycloalkanes of the type hereinbefore set forth undergo decomposition by treatment at an elevated temperature in the presence of a copper-containing catalyst, the preferred catalyst comprising copper chromite although other copper-containing catalysts may also be utilized. The decomposition is usually effected at temperatures ranging from about 300° to about 400° C. and preferably at a temperature of from about 325° to about 375° C. Furthermore, the reaction is usually effected at atmospheric pressure inasmuch as it is preferred to effect the decomposition in the gas phase. This phase of operation is preferred over a liquid phase inasmuch as when the decomposition is effected in a liquid phase, it is usually accompanied with some decomposition of the catalyst. However, when utilizing a gas phase operation for the decomposition of the 2-alkenyl-1-hydroxycycloalkane it has been found that the catalyst may be recovered and reutilized in further operations without a deleterious effect of low activity in catalyst poisoning.

In the preferred embodiment of this invention the decomposition reaction is carried out in a continuous type operation. When such a type of operation is used, a reaction zone which may comprise an unpacked vessel or coil is provided with the copper-containing catalyst and maintained at the proper operation conditions of temperature and pressure, that is, a temperature of from about 325° to about 375° C. and atmospheric pressure. The alkenyl-beta-hydroxycycloalkane is continuously charged to the reaction zone and passed over the copper-containing catalyst in either an upward or downward flow. After a predetermined residence time has been met the reaction product is continuously withdrawn from the reactor, separated from any unreacted starting materials and/or side reaction products which may be present and recovered. If so desired, the reaction or decomposition of the alkenyl-beta-hydroxycycloalkane may be effected in a substantially inert atmosphere, said atmosphere being supplied by the introduction of a substantially inert gas such as nitrogen, helium, etc. into the reaction zone in an amount sufficient to provide the aforesaid substantially inert atmosphere but not sufficient to effectively raise the pressure in the reactor to a point wherein the reactants enter liquid phase instead of the gas phase. The reaction may be effected in a continuous type manner by utilizing the catalyst in a fixed bed and, as hereinbefore set forth, passing the reactant over said catalyst in either an upward or downward flow. In addition, if so desired, the reaction or decomposition of the starting material may be effected in a fluidized manner wherein the catalyst is maintained in a state of turbulence in the reactant.

Examples of unconjugated olefinic aldehydes which may be prepared according to the process of this invention include 3-methyloct-6-en-1-al, 3-ethyloct-6-en-1-al, 3-propyl-6-en-1-al, 3-isopropyl-6-en-1-al, 3-butyl-6-en-1-al, 3,7-dimethyloct-6-en-1-al (beta-citronellal), 3-phenyloct-6-en-1-al, 3-benzyloct-6-en-1-al, 3-tolyloct-6-en-1-al, 3-allyloct-6-en-1-al, 3,7-diphenyloct-6-en-1-al, 3,7-dibenzyloct-6-en-1-al, 3,7-di-p-tolyloct-6-en-1-al, 3,7-diallyloct-6-en-1-al, 7-methyloct-6-en-1-al, 7-ethyloct-6-en-1-al, 3-methylhept-5-en-1-al, 3-ethylhept-5-en-1-al, 3-propylhept-5-en-1-al, 3-isopropylhept-5-en-1-al, 3-phenylhept-5-en-1-al, 3-benzylhept-5-en-1-al, 3-p-tolylhept-5-en-1-al, 3-allylhept-5-en-1-al, 3,6-dimethylhept-5-en-1-al, 3-ethyl-6-methylhept-5-en-1-al, 3-methylnon-7-en-1-al, 3-ethylnon-7-en-1-al, 3-propylnon-7-en-1-al, 3-phenylnon-7-en-1-al, 3-benzylnon-7-en-1-al, 3,5-dimethylnon-7-en-1-al, etc. It is to be understood that the aforementioned compounds are only representatives of the class of compounds which may be prepared and that the present invention is not necessarily limited thereto.

The following examples are given to illustrate the process of the present invention which, however, are not intended to limit the generally broad scope of the present invention in strict accordance therewith.

*Example I*

A 2.5 cm. inner diameter Pyrex glass tube was packed with a layer of Pyrex rings, a layer of copper chromite pellets and another layer of Pyrex rings after which said tube was placed in an electrically heated muffle furnace. The lower part of the tube was fitted with a condenser and a graduated cylinder while a dropping funnel was mounted on the top of the tube. The funnel was partially filled with 2-isopropenyl-5-methylcyclohexanol (isopulegol) and then capped with a helium inlet tube. The system was continuously flushed with a slow stream of helium and the apparatus then heated to an outer tube temperature of 330° C. The isopulegol was then added dropwise and the condensate was collected in the cylinder. A gas-liquid chromatograph of this material disclosed that it contained 44.7% of 3,7-dimethyloct-6-en-1-al (beta-citronellal), 48.5% of isopulegol isomers and 6.8% mixed hydrocarbons. The outer tube temperature was then raised to 375° C. and isopulegol slowly added dropwise. The condensate was recovered and by gas-liquid chromatography was found to contain 51.0% beta-citronellal, 21.7% isopulegol isomers and 27.3% mixed hydrocarbons.

*Example II*

In this example the necessity for a copper-containing catalyst was shown when a 2.5 cm. inner diameter Pyrex glass tube similar to that set forth in Example I was packed with Pyrex rings and placed in an electrically heated muffle furnace. The tube was equipped with a condenser and graduated cylinder at the lower end thereof and with a dropping funnel mounted on the top thereof. Isopulegol was added to the dropping funnel, the system was flushed with helium and heated to a temperature of 330° C. Isopulegol was slowly added to the glass tube and the condensate which was recovered therefrom was analyzed by means of a gas-liquid chromatograph. At 330° C. said condensate analyzed as having 7.2% beta-citronellal and 92.8% isopulegol isomers. The temperature was raised to 350° C., the condensate was recovered and by analysis found to contain 13.2% beta-citronellal and 86.8% isopulegol isomers.

*Example III*

This example was performed to illustrate the necessity for a continuous type operation as well as a temperature in the range of from about 325° to about 375° C. A flask equipped with a stirrer, condenser and gas inlet-outlet tubes contained 50 grams of isopulegol and 1 gram of a commercial powdered copper chromite catalyst. The system was blanketed with nitrogen following which agitation and heat were applied. The internal temperature was taken to reflux (205° C.) and allowed to remain there for 2 hours. After cooling to room temperature the mixture was filtered. A gas-liquid chromatograph of the filtrate disclosed the presence of 7.5% beta-citronellal and 92.5% of isopulegol isomers.

A further illustration of the necessity of operating the reaction within a desired temperature range was made when a continuous type operation similar to that disclosed in Example I above was effected at a temperature of 260° C. A gas-liquid chromatograph of the condensate recovered from the apparatus disclosed that it contained 7.0% of beta-citronellal and 93.0% of isopulegol isomers. When the addition of isopulegol was carried out at 300° C., the condensate was found by analysis to contain 17.6% beta-citronellal, 79.9% isopulegol isomers and 2.5% of mixed hydrocarbons.

It is therefore apparent from the above examples that the decomposition of alkenyl-beta-hydroxycycloalkanes must be effected at a temperature range from about 325° to about 375° C. in the presence of a copper-containing catalyst and in a continuous manner to obtain a relatively high percentage of the desired products of this reaction.

*Example IV*

In this example of Pyrex glass tube of the type herein more fully described in Example I above is packed with a layer of Pyrex rings, a layer of copper chromite catalyst and another layer of Pyrex rings. The tube is placed in a muffle furnace and provided with equipment similar to that set forth in Example I above. The dropping funnel is partially filled with 2-vinyl-5-methylcyclohexanol following which the system is purged with helium and thereafter heated to a temperature of about 350° C. The condensate is recovered and is found by means of gas-liquid chromatography to contain a predominant proportion of 3-methyloct-6-en-1-al.

*Example V*

In this experiment the dropping funnel of an apparatus similar to that described in Example I above is partially filled with 2-vinyl-3,5-diethylcyclohexanol. The process described in Example I above is followed and the condensate which is recovered therefrom is found by gas-liquid chromatography to contain 3,5-diethyloct-6-en-1-al.

*Example VI*

In this example 2-vinyl-5-phenylcyclohexanol is subjected to decomposition in a manner similar to that hereinbefore set forth. The condensate which is recovered is found by analysis to contain 3-phenyloct-6-en-1-al.

*Example VII*

An apparatus similar to that described in Example I above is partially filled with 2-isopropenyl-4-methylcyclopentanol. The system is flushed with an inert gas and the aforementioned alkenyl-beta-hydroxycyclohexane is slowly added dropwise while the temperature is maintained in a range of from about 350° to about 375° C. The condensate is recovered and subjected to analysis by means of a gas-liquid chromatograph, there being recovered 3,6-dimethylhept-5-en-1-al.

I claim as my invention:

1. A process for the production of an unconjugated olefinic oxygen-containing compound which comprises decomposing an alkenyl-beta-hydroxycycloalkane consisting of carbon, hydrogen and oxygen and in which the alkenyl radical contains from 2 to 4 carbon atoms at a temperature in the range of from about 300° to about 400° C. in the presence of a copper chromite catalyst.

2. A process for the production of an unconjugated olefinic aldehyde which comprises decomposing 2-isopropenyl-5-methylcyclohexanol at a temperature in the range of from about 325° to about 375° C. in the presence of a copper chromite catalyst, and recovering the resultant 3,7-dimethyloct-6-en-1-al.

3. A process for the production of an unconjugated olefinic aldehyde which comprises decomposing 2-vinyl-5-methylcyclohexanol at a temperature in the range of from about 325° to about 375° C. in the presence of a copper chromite catalyst, and recovering the resultant 3-methyloct-6-en-1-al.

4. A process for the production of an unconjugated olefinic aldehyde which comprises decomposing 2-vinyl-3,5-diethylcyclohexanol at a temperature in the range of from about 325° to about 375° C. in the presence of a copper chromite catalyst, and recovering the resultant 3,5-diethyloct-6-en-1-al.

5. A process for the production of an unconjugated olefinic aldehyde which comprises decomposing 2-vinyl-5-phenylcyclohexanol at a temperature in the range of from about 325° to about 375° C. in the presence of a copper chromite catalyst, and recovering the resultant 3-phenyloct-6-en-1-al.

6. A process for the production of an unconjugated olefinic aldehyde which comprises decomposing 2-isopropenyl-4-methylcyclopentanol at a temperature in the range of from about 325° to about 375° C. in the presence of a copper chromite catalyst, and recovering the resultant 3,6-dimethylhept-5-en-1-al.

References Cited by the Examiner

UNITED STATES PATENTS

Re. 21,373  2/40  Lazier _____ 260—603

FOREIGN PATENTS 825,602  12/59  Great Britain.

OTHER REFERENCES

Simonsen: The Terpenes (1947), vol. I, page 291.

LEON ZITVER, *Primary Examiner.*